United States Patent

[11] 3,610,568

[72] Inventor William D. Duwe
 Tulsa, Okla.
[21] Appl. No. 843,155
[22] Filed July 18, 1969
[45] Patented Oct. 5, 1971
[73] Assignee Dover Corporation
 Tulsa, Okla.

[54] VALVE ACTUATOR INCLUDING CAM LINKAGE
 4 Claims, 4 Drawing Figs.
[52] U.S. Cl. .................................................. 251/58
[51] Int. Cl. ............................................ F16k 31/163
[50] Field of Search .................................. 251/58, 138

[56] References Cited
UNITED STATES PATENTS
| | | | |
|---|---|---|---|
| 1,923,681 | 8/1933 | McCabe .................. | 251/138 X |
| 3,260,496 | 7/1966 | Borcherdt ............... | 251/58 X |

*Primary Examiner*—Arnold Rosenthal
*Attorney*—Head & Johnson

ABSTRACT: This invention relates to a mechanism for the controlled rotation of a shaft. More particularly, the invention relates to a valve, including means for the controlled opening and closing thereof, including a valve body having a stem opening therein, a stem rotatably received in the stem opening, an arm affixed to the stem and extending radially therefrom, cam plate movably supported relative to the valve body and movable in a plane parallel the arm, the cam plate having an edge defining a cam surface, an upstanding boss portion affixed to the arm and engaging the cam surface, and means of controllably displacing the cam plate relative to the valve body.

PATENTED OCT 5 1971

3,610,568

INVENTOR.
WILLIAM D. DUWE

BY

*Head & Johnson*
ATTORNEYS

VALVE ACTUATOR INCLUDING CAM LINKAGE

CROSS REFERENCE

This disclosure is not related to any pending U.S. or foreign Pat. applications.

BACKGROUND AND OBJECTS OF THE INVENTION

This invention is particularly related as it applies to the opening and closing of a butterfly valve and in one sense includes a butterfly valve having improved opening and closing means. Butterfly valves are well known and widely used in industry. Basically, a butterfly valve includes a valve body having a fluid passageway therethrough. Rotatably positioned in the valve body is a disc which, in one position, is aligned such that the full periphery of the disc engages the fluid passageway around the entire circumference thereof and thereby the valve is closed against fluid flow. In the fully open position the valve disc is rotated 90° relative to the closed position and permits fluid flow through the fluid passageway to either side of the disc.

While butterfly valves are constructed in a variety of configurations most are characterized by a valve stem opening in the valve body perpendicular the fluid passageway. Rotatably positioned in the stem opening is a valve stem which, at its lower end, engages or is secured to the valve disc for the rotation thereof in the valve body. The upper end of the stem extends externally of the valve and affords means of rotating the valve disc between opened and closed positions. In some applications all that is needed to provided means of opening and closing the valve disc is a handle which is secured to the valve stem externally of the valve. By this means the valve disc can be manually moved between opened and closed positions. In many instances, however, it is desirable or necessary that butterfly valves be controlled remotely or automatically. This invention provides a means of controlling the opening and closing of a butterfly valve in a nonmanual arrangement, that is, by means of a hydraulically actuated cylinder and piston which affords the opportunity of remotely controlling the opening and closing of the valve.

Butterfly valves have a virtually universal characteristic, that is, the torque which must be applied to the stem varies widely when moving the valve from the fully closed to the fully opened position. Since a butterfly valve functions to close against fluid flow by the seating of the periphery of a disc against the internal circumferential surface of the valve seat forming the fluid passageway it apparent that the torque experienced in opening the valve is relatively very high during the first few degrees of rotation of the valve stem, that is, during the period wherein the periphery of the disc is moved out of contact with the valve seat. During the balance of the arc through which the stem is rotated to move the valve from the fully closed to fully opened position the torque required is greatly reduced. The opposite, of course, is true when the valve is closed. As it is moved from the fully open toward the fully closed position relatively little torque is required until the final few degrees of rotation as the full periphery of the disc engages with the circumferential seat surface. For these reasons it is desirable that an actuating mechanism for opening and closing a butterfly valve provide variable torque so that increased torque is applied during the first few degrees of the rotation of the valve stem as the valve is opened and the last few degrees of rotation as the valve is closed.

It is therefore an object of this invention to provide a mechanism for the controlled rotation of a shaft.

More particularly, it is an object of this invention to provide a mechanism for the controlled rotation of a valve stem.

Still more particularly, it is an object of this invention to provide a mechanism for the controlled opening and closing of a butterfly valve.

An additional particular object of this invention is to provide a mechanism for the controlled opening an closing of a butterfly valve including means of imparting variable torque through the opening and closing rotation of the valve stem whereby increased torque is applied during the first few degrees of opening and the last few degrees of closing the valve.

Another particular object of this invention is to provide a valve including means for the controlled opening and closing thereof.

A further object is to provide a butterfly valve having means for the controlled opening and closing thereof and particularly including means of providing variable torque to the valve stem during the opening and closing thereof whereby increased torque is applied during the first few degrees of opening and the last few degrees of closing the valve.

These objects, as well as others, will be understood by reference to the description and claims, taken in conjunction with the drawings.

DESCRIPTION OF THE VIEWS

DETAILED DESCRIPTION

Figure 1:
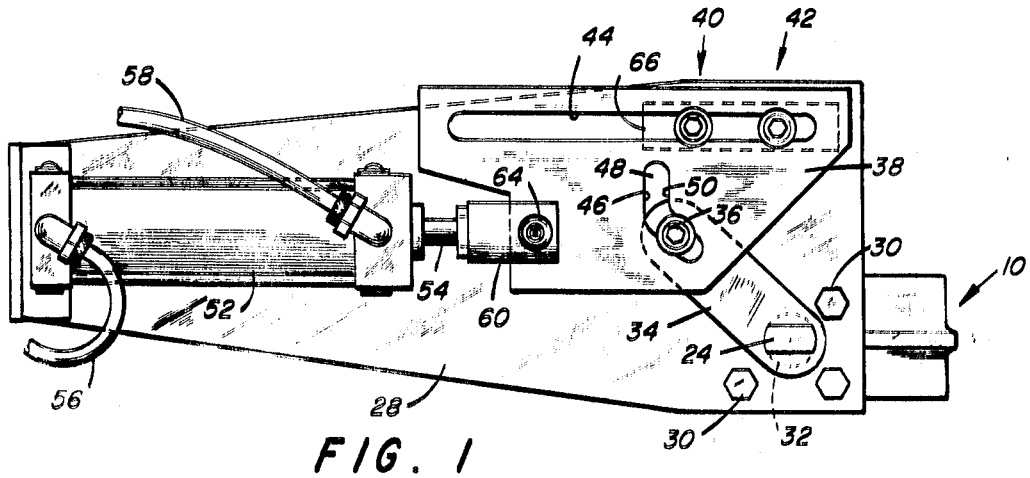
FIG. 1 is a top view of an embodiment of this invention showing the mechanism used for the controlled rotation of a stem of a butterfly valve.
Figure 3:
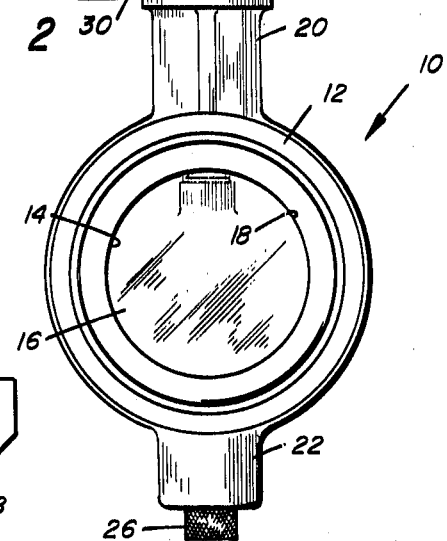
FIG. 3 is a partial top view as shown in FIG. 1 showing the mechanism in a position wherein the valve is in the fully opened position.

Referring first to FIGS. 1 and 3, a specific embodiment incorporating the principles of this invention is illustrated.

While the invention is applicable in its broadest sense to the controlled rotation of a shaft for any ultimate purpose and in a narrower sense to the controlled rotation of a shaft of a valve, in this specific embodiment illustrated the invention is shown as applied to the controlled opening and closing of a butterfly valve. The butterfly valve is indicated generally by the numeral 10. The invention is equally applicable to any of the many types of butterfly valves and the specific arrangement of the valve 10 is not a part of this invention. Essentially the valve 10 includes a valve body 12 having a fluid passageway 14 therethrough. The valve body 12 as illustrated is adaptable to be inserted between flange plates (not shown), the flange plates being secured together to hold the valve in leakproof relationship relative to a pipeline or the like.

Figure 2:
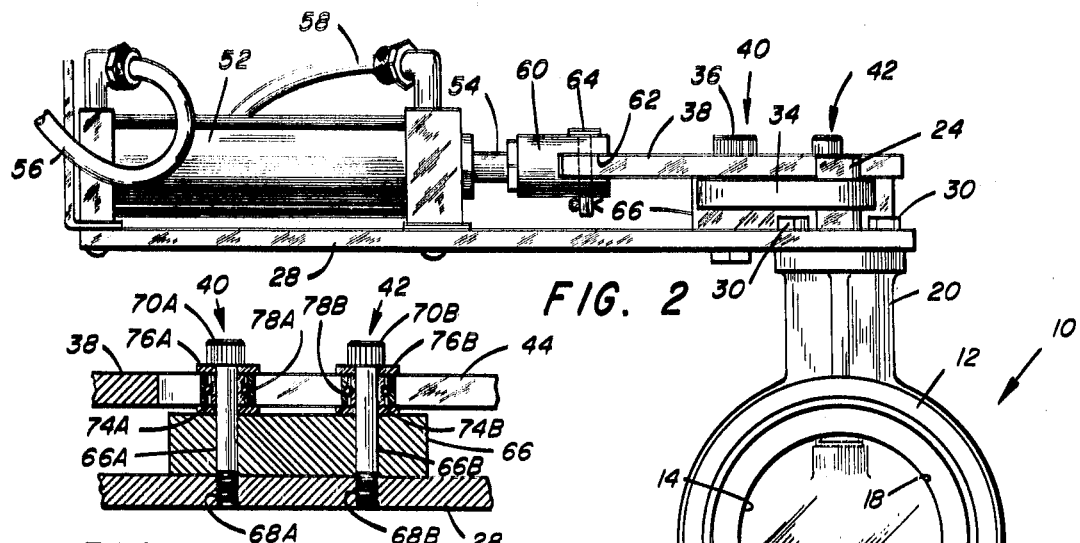
FIG. 2 is an elevational view of the arrangement shown in FIG. 1 and showing the valve in the closed position.

Rotatably positioned in the fluid passageway 14 is a disc 16. While disc 16 may take a variety of configurations in the typical butterfly valve it is essentially a flat element having a peripheral surface 18 which, when the valve is in the closed position as shown in FIGS. 1 and 2, engages the full interior circumference of fluid passageway 14 to thereby prevent the passage of fluid through the valve. When the disc 16 is rotated 90° relative to the position shown in FIG. 2, such as shown in FIG. 3, fluid is free to pass to either side of the valve disc and the valve is said to be in the fully opened position.

Valve body 12 typically includes an upper stem boss portion 20 and a lower stem boss portion 22 each of which has an aligned axial opening (not shown) therethrough rotatably receiving a stem which supports the valve disc 16. The upper stem extends partially externally of the valve, the externally extending upward portion being indicated by the numeral 24. The upper stem portion 24 is shown with flat surfaces to afford the attachment of handle means thereto it being understood that within the boss portion 22 the stem 24 is circular in cross section and the valve typically includes some seal means to prevent the escape of fluid along the stem.

The lower stem boss portion 22 likewise contains a circular cross-sectional opening therethrough (not shown) which receives a lower stem 26, the external portion of which is shown knurled in FIG. 2. In some arrangements the lower boss portion 22 is not drilled completely through so that the stem does not extend externally below the valve body as is shown in FIG. 2. Some butterfly valve arrangements include a unitary stem extending rotatable through the upper boss portion 20 and lower boss portion 22 while others utilize separate upper and lower stem portions. As previously stated the specific arrangement of the butterfly valve 10 and the stem arrangement is not relative to the invention.

The valve 10 described to this point is not, within itself, unique as to this disclosure and is intended only to be exemplary of valves in general and particularly butterfly valves. This invention is concerned with providing means of controllably opening and closing the disc 16 by controllably rotating stem 24.

Affixed to the upper stem boss 20 is a baseplate 28 which extends in a plane perpendicular to the axis of stem 24 and is shown secured to the valve body by means of bolts 30. The baseplate 28 has an opening 32 therein which rotatably receives the stem 24.

Affixed to stem 24 and extending in a plane perpendicular the axis thereof and parallel the baseplate is an arm 34. Affixed to the outer end of arm 34 is an upstanding boss portion 36, the axis of which is parallel to the axis of stem 24. The boss portion 36 may be, as illustrated, in the form of a bolt which receives a small bearing having a washer above the bearing similar to the arrangement of the guide posts which will be described in detail subsequently.

Figure 4:
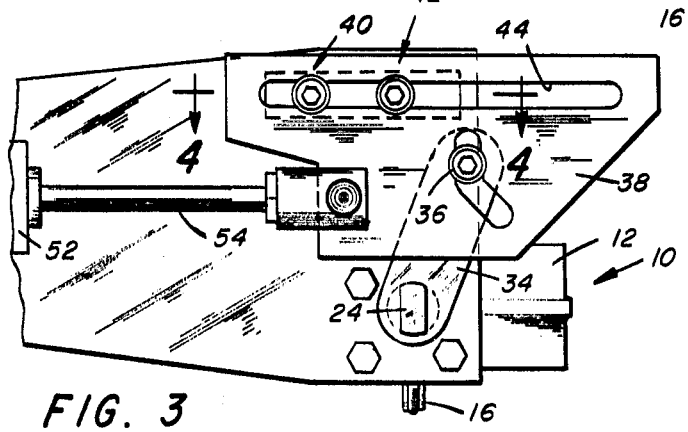
FIG. 4 is a partial cross-sectional view taken along the line 4—4 of FIG. 3 showing the arrangement of the guide posts utilized to provide linear slidable displacement of the cam plate.

A cam plate 38 is movably supported in a plane parallel arm 34 and parallel baseplate 28. In the illustrated arrangement the cam plate is supported as best seen in FIG. 4, by a pair of upstanding spaced apart guide posts, generally indicated by numerals 40 and 42. The cam plate 38 includes a linear, parallel sided, guide slot 44 which receives the guide posts 40 and 41 so that the cam plate 38 is linearly movable or reciprocable in a plane parallel the baseplate 28.

A portion of the cam plate 38 includes an edge defining a cam surface 46 (see FIGS. 1 and 3.) In the preferred embodiment illustrated the cam plate 38 includes a cam slot 48 of which the cam edge 46 forms one boundary thereof. As illustrated, and being the typical arrangement, cam slot 48 includes paralleled edges 46 and 50 receiving the arm boss portion 36 therebetween.

Supported to baseplate 28 as sown in FIGS. 1 and 2, is a hydraulic cylinder 52 including a piston rod 54 extending therefrom. The hydraulic cylinder 52 includes a piston portion (not shown) affixed to the inner end of piston rod 54 whereby fluid pressure supplied through conduits 56 and 58 actuate the piston to thereby reciprocate the piston rod 54. The outer end of piston rod 54 is secured to cam plate 38. In the illustrated embodiment the outer end of the piston rod 54 includes a clevis 60 having a slot 62 therein which receives the cam plate 38, a pin 64 extending through a clevis and through cam plate 38.

Referring to FIG. 4 the arrangement of the guide posts 40 and 42 is best shown. Positioned on baseplate 28 is a guide post support block 66 having openings 66A and 66B therein. Baseplate 28 includes threaded openings 68A and 68B in alignment with openings 66A and 66B. Extending through openings 66A and 68A is a bolt 70A and in like manner extending through openings 66B and 68B is a bolt 70B. Received on each of bolts 70A and 70B is a lower washer 74A and 74B respectively, and an upper washer 76A and 76B respectively. Washers 74A, 74B, 76A and 76B each have a diameter greater than the width of guide slot 44. Received on bolt 70A is a bearing 78A and in like manner received on bolt 70B is a bearing 78B. The outer diameter of the outer race of bearing 78A and 78B is substantially equal to and just slightly less than the width of guide slot 44 so that the cam plate 38 is free to move linearly relative to the baseplate 28.

The preferred arrangement of boss portion 36 extending upwardly from the outer end of arm 34 is the same as described for guide posts 40 and 42. That is, the preferred arrangement of the boss portion 36 includes a bearing arrangement received in cam slot 48.

OPERATION

FIGS. 1 and 2 show the valve 10 in closed position. When hydraulic pressure is applied to hydraulic cylinder 52 in the correct direction piston rod 54 is extended outwardly. This causes the cam plate 38 to displace linearly and forces the cam surface 46 against boss portion 36. It will be noted in FIG. 1 that the configuration of the cam surface 46 is such that during the first portion of the linear movement of piston rod 54 the cam surface is inclined at a high angle relative to the line of motion of rod 54. This means that during the first increments of linear movement of piston rod 54 only a small degree of rotation is imparted by the cam surface 46 against boss portion 36 and thereby arm 34. This configuration of the cam surface 46 derives a leverage advantage such that a high degree of torque is applied during the first few degrees of rotation of stem 24 as piston rod 54 advances linearly.

As the piston rod 54 extends further outward towards the valve open position shown in FIG. 3, the cam surface 46 changes such that for a given linear displacement of piston rod 54 and thereby cam plate 38 a greater degree of rotation is imparted to stem 24. Thus, as the stem 24 is rotated towards the opened position less torque is applied.

In the illustrated arrangement the cam slot 48 is of a width to slidably receive the boss portion 36. This means that the opening cam edge 46 is essentially the same configuration as the closing cam edge 50. Thus, as the direction of pressure in hydraulic cylinder 52 is reversed and piston rod 54 is withdrawn, the force applied by the closing cam surface 50 against boss portion 36 applies less torque at the beginning and greater torque as the valve disc moves to the closed position.

It can be seen that, if desired, the configuration of the closing cam surface 46 and opening cam surface 50 could be different as long as sufficient space existed between the two surfaces for the passage of the boss portion 36. This arrangement wherein the forward and reverse cam surfaces are different would, in some instances, result in the two cam surfaces being further apart than the diameter of the arm boss portion 36 which may be undesirable in that it would allow unrestrained pivotation of the arm and disc. For this reason, the preferred arrangement is as illustrated wherein the cam slot 58 is of consistent width receiving boss portion 36 so as not to permit unrestrained pivotation of the valve disc.

The invention has been described with a great deal of particularity although it is manifest that many changes may be made in the details of construction and the arrangement of components without departing from the spirit and scope of this disclosure. For instance, cylinder 52 is described as a hydraulic cylinder and this expression includes a pneumatic cylinder arrangement. In addition, hydraulic cylinder 52 may be replaced by a gear drive arrangement actuated by an electric motor, hydraulic motor, or the like. Thus, any arrangement for the linear movement of cam plate 38 is within the purview of the invention. While only one example of a configuration of a cam slot 48 has been illustrated it is apparent that the configuration may vary greatly according to particular application to which the apparatus is to be used.

What is claimed is:

1. A valve including means for the controlled opening and closing thereof comprising:
   a valve body having a fluid passageway therethrough and a stem boss portion having a stem opening therein perpendicular said fluid passageway;
   a closure member supported in said fluid passageway and rotatable in one direction to close said passageway and in the opposite direction to open said passageway;
   a stem rotatably received in said stem opening, said stem being affixed to said closure member for the rotation thereof, a portion of said stem extending externally of said valve body;
   an arm affixed to said stem and extending radially therefrom;

a cam plate movably supported relative to said valve body and movable in a plane parallel said arm, said cam plate having an edge defining a cam surface and having a parallel sided guide slot therein spaced from said cam surface;

an upstanding boss portion affixed to said arm and engaging said cam surface;

a pair of upstanding spaced apart guide posts affixed to said valve body and slidably received in said guide slot in said cam plate whereby said cam plate is linearly movable relative to said valve body; and means of controllably displacing said cam plate relative to said valve body, said cam edge engaging said boss portion and rotating said arm and thereby said valve stem.

2. A valve including means for the controlled opening and closing thereof according to claim 1 wherein said cam plate has a cam slot therein receiving said boss portion upstanding from said arm, the edges of said cam slot forming said cam surface.

3. A valve including means for the controlled opening and closing thereof according to claim 1 including:

a baseplate affixed to said valve body in a plane perpendicular said valve stem and having an opening therein rotatably receiving said valve stem, said guide posts being affixed to the baseplate, said arm extending parallel to and spaced from said baseplate, said cam plate being movably supported relative to and in a plane parallel and spaced from said baseplate.

4. A valve including means for the controlled opening and closing thereof according to claim 3 wherein said means of controllably displacing said cam plate includes:

a hydraulic cylinder having a piston rod reciprocably extending therefrom, said hydraulic cylinder being affixed to said baseplate and the outer end of said piston rod being affixed to said cam plate.